United States Patent [19]

Yoshitake et al.

[11] Patent Number: 4,798,866

[45] Date of Patent: Jan. 17, 1989

[54] BRANCHED ALPHA-OLEFIN POLYMER COMPOSITION AND PROCESS FOR ITS PRODUCTION

[75] Inventors: Junichi Yoshitake, Kasuga; Hiroaki Kitani, Waki; Norio Kashiwa, Iwakuni; Takeshi Muranaka, Ichihara; Kenichi Tominari, Iwakuni; Shigeki Nagamatsu, Ohtake, all of Japan

[73] Assignee: Mitsui Petrochemical Industries, Ltd., Tokyo, Japan

[21] Appl. No.: 72,670

[22] Filed: Jul. 13, 1987

[30] Foreign Application Priority Data

Jul. 14, 1986 [JP] Japan ............................ 61-163564
Jul. 7, 1987 [JP] Japan ............................ 61-167892

[51] Int. Cl.$^4$ ................. C08L 23/18; C08F 210/14
[52] U.S. Cl. ............................ 525/191; 525/268; 525/240; 525/243; 525/53; 526/125; 526/348.3; 526/348.4; 526/903; 526/65
[58] Field of Search ............................ 525/240, 191

[56] References Cited

U.S. PATENT DOCUMENTS

| | | | |
|---|---|---|---|
| 3,692,712 | 9/1972 | Brooks | 525/240 |
| 4,146,591 | 3/1979 | Fakui et al. | 260/878 |
| 4,166,057 | 8/1979 | Takemori | 525/240 |
| 4,645,797 | 2/1987 | Suga et al. | 525/191 |
| 4,659,792 | 4/1987 | Kashiwa et al. | 526/73 |

FOREIGN PATENT DOCUMENTS 1568659 6/1980 United Kingdom .

Primary Examiner—Carman J. Seccuro
Attorney, Agent, or Firm—Sherman and Shalloway

[57] ABSTRACT

A branched alpha-olefinic polymer composition having excellent melt flowability, good moldability and excellent melt tension and comprising at least two branched alpha-olefinic polymers each composed of (A) recurring units derived from a branched alpha-olefin containing 5 to 10 carbon atoms and having a branch at the 3-position or a position of a higher number and (B) recurring units derived from a linear alpha-olefin containing 2 to 20 carbon atoms; and a process for producing this polymer composition by a multiplicity of polymerization steps using a catalyst formed from (A) a highly stereoregular titanium catalyst component comprising magnesium, titanium, halogen and an electron donor as essential ingredient, (B) an organoaluminum compound and (C) an electron donor.

10 Claims, 1 Drawing Sheet

FIG. 1

BRANCHED ALPHA-OLEFIN POLYMER COMPOSITION AND PROCESS FOR ITS PRODUCTION

BACKGROUND OF THE INVENTION

1. Field of the Invention

This invention relates to a branched alpha-olefin polymer composition having excellent melt-flowability, good moldability and excellent melt tension, and to a process for its production.

More specifically, it relates to a branched alpha-olefin polymer composition having excellent meltflowability, good moldability and excellent melt tension and comprising at least two branched alpha-olefin polymers composed of (A) recurring units derived from a branched alpha-olefin containing 5 to 10 carbon atoms and having a branch at the 3-position or a position of a higher number and (B) recurring units derived from a linear alpha-olefin containing 2 to 20 carbon atoms, and to a process for producing said polymer composition by a multiplicity of polymerization steps.

2. Description of the Prior Art

There have been a number of attempts to produce branched alpha-olefinic polymers having excellent transparency and thermal stability by polymerizing or copolymerizing branched alpha-olefins such as 4-methyl-1-pentene and 3-methyl-1-pentene in the presence of stereo-regular Ziegler catalysts comprising titanium trihalides such as TiCl$_3$. The resulting branched alpha-olefinic polymers have a broad molecular weight distribution and execllent melt flowability and moldability, but have the defect of poor stereoregularity and, rigidity. Furthermore, the catalysts have poor polymerization activity.

The present applicant studied the production of branched alpha-olefinic polymers using conventional titanium trihalide catalysts, and found that alpha-olefinic polymers having excellent stereoregularity and rigidity can be obtained by employing a method which comprises polymerizing branched alpha-olefins in the presence of a catalyst formed from a highly active titanium catalyst component, an organoaluminum compound and an organosilicon compound. This finding was proposed in Japanese Laid-Open Patent Publication No. 206418/1984. The branched alpha-olefinic polymers obtained by the method described in this patent document have excellent stereoregularity and rigidity, but are still desired to be improved in such properties as melt flowability, moldability and melt tension.

SUMMARY OF THE INVENTION

It is an object of this invention to provide a branched alpha-olefinic polymer composition having excellent melt flowability, good moldability and excellent melt tension and comprising at least two branched alphaolefinic polymers each composed of (A) recurring units derived from a branched alpha-olefin containing 5 to 10 carbon atoms and having a branch at the 3-position or a position of a higher number and (B) recurring units derived from a linear alpha-olefin containing 2 to 20 carbon atoms; and a process for producing this polymer composition by a multiplicity of polymerization steps using a catalyst formed from (A) a highly stereoregular titanium catalyst component comprising magnesium, titanium, halogen and an electron donor as essential ingredient, (B) an organoaluminum compound and (C) an electron donor.

The above object of this invention is achieved in accordance with this invention by a branched alphaolefinic polymer composition comprising

[I] a branched alpha-olefinic polymer composed substantially of 80 to 100 mole % of (A) recurring units derived from a branched alpha-olefin containing 5 to 10 carbon atoms and having a branch at the 3-position or a position of a higher number and 0 to 20 mole % of (B) recurring units derived from a linear alpha-olefin containing 2 to 20 carbon atoms and having an intrinsic viscosity $[\eta]_H$, determined in decalin at 135° C., of 5 to 30 dl/g, and

[II] a branched alpha-olefinic polymer composed substantially of 80 to 100 mole % of (A) recurring units derived from a branched alpha-olefin containing 5 to 10 carbon atoms and having a branch at the 3-position or a position of a higher number and 0 to 20 mole % of (B) recurring units derived from a linear alpha-olefin containing 2 to 20 carbon atoms and having an intrinsic viscosity $[\eta]_L$, determined in decalin at 135° C., of 1 to 10 dl/g, wherein the $[\eta]_H/[\eta]_L$ ratio is from 2 to 30, the weight ratio of the polymer I) to the polymer II is from 1/99 to 60/40, said composition has an intrinsic viscosity $[\eta]$, measured in decalin at 135° C., of 1 to 20 dl/g, and the ratio of the melt flow rate of said composition measured at 260° C. under a load of 5 kg [MFR$_{260°\ C.}^{5\ kg}$] to its melt flow rate measured at 260° C. under a load of 1 kg [MFR$_{260°\ C.}^{1\ kg}$] is from 10 to 30.

The above object is also achieved in accordance with this invention by a process for producing a branched alpha-olefinic polymer composition having an intrinsic viscosity $[\eta]$, measured in decalin at 135° C., of 1 to 20 dl/g and a ratio of its melt flow rate measured at 260° C. under a load of 5 kg [MFR$_{260°\ C.}^{5\ kg}$] to its melt flow rate measured at 260° C. under a load of 1 kg [MFR$_{260°\ C.}^{1\ kg}$] of from 10 to 30, which comprises polymerizing or copolymerizing a branched alpha-olefin containing 5 to 10 carbon atoms and having a branch at the 3-position or a position having a higher number, or a mixture of the branched alpha-olefin and a linear alpha-olefin containing 2 to 20 carbon atoms in a multiplicity of polymerization steps in the presence of a catalyst formed from (A) a highly stereoregular titanium catalyst component containing magnesium, titanium, halogen and an electron donor as essential ingredients, (B) an organoaluminum compound, and (C) an electron donor; wherein in at least one of the polymerization steps, a branched alpha-olefinic polymer [I] having an intrinsic viscosity $[\eta]_M$, measured in decalin at 135° C., of 5 to 30 dl/g is formed in an amount of 1 to 60% by weight based on the branched alpha-olefinic polymer composition formed in the entire polymerization steps, and in another polymerization step, a branched alpha-olefinic polymer [II] having an intrinsic viscosity $[\eta]_L$, measured in decalin at 135° C., of 1 to 10 dl/g with the $[\eta]_H/[\eta]_L$ ratio being from 2 to 30 is formed in an amount of 99 to 40% by weight based on the branched alpha-olefin polymer composition formed in the entire polymerization steps.

DETAILED DESCRIPTION OF THE PREFERRED EMBODIMENTS

This branched alpha-olefinic polymer composition of this invention contains two branched alpha-olefinic polymers [I] and [II].

The branched alpha-olefinic polymer [I] contained in the branched alpha-olefinic polymer composition of this invention consists substantially of 80 to 100 mole %, preferably 90 to 100 mole %, more preferably 95 to 100 mole %, of (A) recurring units derived from a branched alpha-olefin containing 5 to 10 carbon atoms and having a branch at the 3-position or a position having a higher number and 0 to 20 mole %, preferably 0 to 10 mole %, more preferably 0 to 5 mole %, of (B) recurring units derived from a linear alpha-olefin containing 2 to 20 carbon atoms, and has an intrinsic viscosity $[\eta]_H$, measured in decalin at 135° C., of 5 to 30 dl/g, preferably 6 to 30 dl/g, more preferably 8 to 30 dl/g.

The branched alpha-olefinic polymer [I] contained in the branched alpha-olefinic polymer composition of the invention consists substantially of 80 to 100 mole %, preferably 90 to 100 mole %, more preferably 95 to 100 mole %, of (A) recurring units derived from a branched alpha-olefin containing 5 to 10 carbon atoms and having a branch at the 3-position or a position of a higher number and 0 to 20 mole %, preferably 0 to 10 mole %, more preferably 0 to 5 mole %, of (B) recurring units derived from a linear alpha-olefin containing 2 to 20 carbon atoms and having an intrinsic viscosity $[\eta]_L$, measured in decalin at 135° C., of 1 to 10 dl/g, preferably 1 to 8 dl/g, more preferably 1 to 6 dl/g with the $[\eta]_H/[\eta]_L$ ratio being from 2 to 30, preferably from 2 to 20, more preferably from 2 to 10.

If in the branched alpha-olefinic polymers [I] and [II], the proportion of the recuring units (A) derived from the aforesaid branched alpha-olefin is less than 80 mole % and the proportion of the recurring units (B) derived from the aforesaid linear alpha-olefin, the branched alpha-olefinic polymer composition comprising the branched alpha-olefinic polymers [I] and [II] has reduced thermal stability and rigidity.

The intrinsic viscosities $[\eta]_H$ and $[\eta]_L$ are measures of the molecular weights of the branched alpha-olefinic polymers [I] and [II] contained in the branched alpha-olefinic polymer composition of this invention. These characteristic values, in combination with the other characteristic values, serve to impart the aforesaid excellent properties to the branched alpha-olefinic polymer composition.

If the above $[\eta]_H/[\eta]_L$ ratio is less than 2, an improvement in melt flowability, moldability and melt tension cannot be expected. If it is larger than 30, it is difficult to permit uniform mixing of the polymers [I] and [II], and the thermal stability and mechanical properties of the resulting composition are deteriorated.

The weight ratio of the branched alpha-olefinic polymers [I[ and [II] in the composition of this invention is from 1/99 to 60/40, preferably from 2/98 to 50/50, more preferably from 5/95 to 50/50. This characteristic value is a measure of the molecular weight distribution of the branched alpha-olefinic polymer composition of this invention, and in combination with the other characteristic values, serves to give the aforesaid excellent properties to the branched alpha-olefinic polymer composition. If the above weight ratio is less than 1/99, an improvement in melt flowability, moldability and melt tension cannot be expected. The same problem arises if it is larger than 60/40.

The branched alpha-olefinic polymer composition has an intrinsic viscosity $[\eta]$, measured in decalin at 135° C., of 1 to 20 dl/g, preferably 1 to 15 dl/g, more preferably 1 to 10 dl/g. This characteristic value is a measure of the molecular weight of the branched alpha-olefinic polymer composition of this invention, and in combiantion with the other characteristic values, serves to impart the aforesaid excellent properties to the branched alpha-olefinic polymer composition. If the intrinsic viscosity $[\eta]$ is less than 1 dl/9, the mechanical properties of the polymer composition are deteriorated. If it is larger than 20 dl/g, the moldability of the composition is reduced.

When the branched alpha-olefinic polymer composition of this invention is granulated by extrusion at a temperature of 260° to 340° C. with a residence time of 1 to 5 minutes so as to adjust its $MFR_{260°\ C.}^{5\ kg}$ of 20 to 40 g/10 min., the ratio of its melt flow rate measured at 260° C. under a load of 5 kg $[MFR_{260°\ C.}^{5\ kg}]$ to its melt flow rate measured at 260° C. under a load of 1 kg $[MFR_{260°\ C.}^{1\ kg}]$, i.e. $[MFR_{260°\ C.}^{5\ kg}]/[MFR_{260°\ C.}^{1\ kg}]$, is from 10 to 30, preferably from 12 to 30, more preferably from 12 to 25. This melt flow rate ratio $[MFR_{260°\ C.}^{5\ kg}]/[MFR_{260°\ C.}^{1\ kg}]$ is a measure of the molecular weight distribution of the branched alpha-olefinic polymer composition, and in combination with the other characteristic values, serves to impart the aforesaid excellent properties to the branched alpha-olefinic polymer composition. If the above melt flow rate ratio is less than 10, the moldability of the composition is reduced. If it is larger than 30, the mechanical properties of the composition are deteriorated.

The molecular weight distribution ($\overline{Mw}/\overline{Mn}$) to the branched alpha-olefinic polymer composition of this invention determined by gel permeation chromatography (GPC) is 3 to 20, preferably 3.5 to 15, especially preferably 4 to 10. This characteristic value of the branched alpha-olefinic polymer composition of this invention, in combination with the other characteristic values, imparts the aforesaid excellent properties to the branched alpha-olefinic polymer composition.

The $\overline{Mw}/\overline{Mn}$ value was measured by the following method in accrrdance with Takeuchi, "Gel Permeation Chromatography", published by Maruzen, Tokyo.

(1) The GPC count of standard polystyrene (monodisperse polystyrene made by Toyo Soda Co., Ltd.) having a known molecular weight M is measured, and a calibration curve for the molecular weight M versus the elution volume (EV) is drawn. The concentration of the standard polystyrene at this time is adjusted to 0.02% by weight (2) A gel permeation chromatogram of a sample polymer is taken by GPC measurement. From the calibration curve mentioned in (1) above, the number average molecular weight $\overline{Mn}$ and weight average molecular weight $\overline{Mw}$ of the sample polymer are calculated. The $\overline{Mw}//$ n is thus obtained. The sample preparing conditions and the GPC measurement conditions at this time are as follows.

[Sample preparation]

(a) The sample is put in an Erlenmeyer flask together with o-dichlorobenzene as a solvent so that its concentration beccomes 0.1% by weight.

(b) 2,6-Di-tert-butyl-p-cresol, an antioxidant, is added in an amount of 0.05% by weight based on the polymer solution to the Erlenmeyer flask containing the sample.

(c) The Erlenmeyer flask is heated to 140° C., and the mixture is stirred for about 30 minutes to dissolve the sample.

(d) The polymer solution is subjected to GPC.

[GPC measuring conditions)

GPC is carried out under the following conditions.
(a) Device: 150C-ALC/GPC made by Waters Co.
(b) Column: GMH type made by Toyo Soda Co., Ltd.
(c) Amount of the sample: 400 microliters
(d) Temperature: 140° C.
(e) Flow rate: 1 ml/min.

The branched alpha-olefinic polymer composition of this invention has a crystallinity, measured by the X-ray diffraction method, of 0.5 to 60%, preferably 0.5 to 50%. This characteristic value is a measure of the excellent rigidity and tensile properties of the branched alpha-olefinic polymer composition of this invention, and in combination with the other characteristic values, serves to impart the aforesaid excellent properties to the branched alpha-olefinic polymer composition. The crystallinity was determined by X-ray diffractometry using a 1.5 mm-thick press sheet.

The branched alpha-olefinic polymer composition of this invention contains 0.1 to 20% by weight, preferably 0.5 to 10% by weight, of a portion soluble in n-decane at 10° C. The amount of this n-decane-soluble portion is measured by the following method. One gram of the polymer is dissolved in 100 ml of n-decane and the solution was cooled to 10° C. The solution is left to stand at 10° C. for 1 hour to precipitate highly crystalline components. The soluble portion is collected by filtration, and the solvent is removed. The amount of the residue is weighed, and the proportion (% by weight) of the n-decane-soluble portion is calculated.

The branched alpha-olefinic polymer composition of this invention described hereinabove can be produced by the process of this invention to be described. First, the catalyst used in the process will be described in detail.

The highly stereoregular titanium catalyst component (A) used in this invention contains magnesium, titanium, halogen and an electron donor as essential ingredients. In this titanium catalyst component (A), the magnesium/titanium atomic ratio is preferably from about 2 to about 100, more preferably from about 4 to about 70; the halogen/titanium atomic ratio is preferably from about 4 to about 100, more preferably from about 6 to about 40; and the electron donor/titanium mole ratio of preferably from about 0.2 to about 10, more preferably from about 0.4 to about 6. The titanium catalyst component (A) has a specific surface area of preferably at least about 3 $m^2/g$, more preferably at least about 40 $m^2/g$, more preferably about 100 $m^2/g$ to about 8000 $m^2/g$.

Usually, the titanium catalyst component (A) does not substantially liberate a titanium compound by simple means such as washing with hexane at room temperature. The X-ray spectrum of the titanium catalyst component (A) shows amorphousness with respect to the magnesium compound irrespective of the type of the starting magnesium compound used for catalyst preparation, or it is much more amorphous than an ordinary commercial grade magnesium dihalide.

The titanium catalyst component (A) may contain other elements, metals and functional groups in addition to the above essential ingredients so long as they do not greatly deteriorate the performance of the catalyst. Alternatively, it may be diluted with an organic or inorganic diluent. The inclusion of the other elements and metals or diluents may sometimes adversely affect the specific surface area or amorphousness of the resulting catalyst. In such a case, the catalyst preferably has the aforesaid specific surface area and amorphousness when such other ingredients are removed.

The titanium component (A) has an average particle diameter of preferably about 1 to about 200 micrometers, more preferably about 5 to about 100 micrometers, and the geometric standard deviation $\sigma_g$ of its particle size distribution is preferably less 2.1, more preferably not more than 1.95. It is preferably in a uniform regular shape, such as a true sphere, an ellipsoid or a granule.

The titanium catalyst component (A) may preferably be produced by a method which comprises contacting a magnesium compound (or magnesium metal), a titanium compound and an electron donor or an electron donor-forming compound (a compound capable of forming an electron donor) with one another with or without a reaction reagent. The method may be performed in the same way as in the preparation of known highly active titanium catalyst components containing magnesium, titanium, halogen and an electron donor a essential ingredients. For example, it may be produced substantially in accordance with the methods disclosed in Japanese Laid-Open Patent Publications Nos. 108385/1975, 126590/1975, 20297/1976, 28189/1976, 64586/1976, 92885/1976, 136625/1976, 87489/1977, 100596/1977, 147688/1977, 104593/1977, 2580/1978, 40093/1978, 43094/1978, 135102/1980, 135103/1980, 811/1981, 11908/1981, 18606/1981, 83006/1983, 138705/1983, 138706/1983, 138707/1983, 138708/1983, 138709/1983, 138710/1983, and 138715/1983.

Several examples of the method of producing the titanium catalyst component (A) will be described below briefly.

(1) A magnesium compound or a magnesium compound/electron donor complex, either as such or after it is pre-treated with an electron donor and/or a reaction aid such as an organoaluminum compound or a halogen-containing silicon compound in the presence or absence of an electron donor or a pulverization aid with or without pulverization, is reacted with a titanium compound in the liquid state under the reaction conditions. The above electron donor is used at least once.

(2) A liquid form of a magnesium compound having no reducing ability is reacted with a liquid titanium compound in the presence of an electron donor to precipitate a solid titanium complex.

(3) The reaction product obtained in (2) is further reacted with a titanium compound.

(4) The product obtained in (1) or (2) is further reacted with an electron donor and a titanium compound.

(5) A magnesium compound or a magnesium compound/electron donor complex is pulverized in the presence of a titanium compound in the presence or absence of an electron donor and a pulverization aid. The resulting solid, either as such or after it is pre-treated with an electron donor and/or a reaction aid such as an organoaluminum compound or a halogen-containing silicon compound, is treated with halogen, a halogen-containing compound or an aromatic hydrocarbon. The electron donor is used at least once.

If in the above methods of preparing the titanium catalyst component (A), at least one of the magnesium compound and the titanium compound contains a halogen atom, it is not particularly necessary to use a halogenating agent such as a halogen-containing silicon compound or a halogenated organoaluminum compound. If none of them contain a halogen atom, the above halogenating agent is used.

Preferred among them are the methods in which a liquid titanium halide is used, or a halogenated hydrogen is used after or during the use of the titanium compound.

Examples of the electron donor used in the above catalyst component preparation are diesters, diester-forming compounds, alcohols, phenols, aldehydes, ketones, ethers, carboxylic acids, carboxylic acid anhydrides, carbonic acid esters, monoesters and amines.

Among the electron donors as an essential ingredient of the highly active titanium catalyst component (A), the diesters are preferably esters of dicarboxylic acids in which the two carboxyl groups are bonded to one carbon atom, or esters of dicarboxylic acids in which the carboxyl groups are bonded respectively to two adjacent carbon atoms. Examples of the dicarboxylic acids in such esters of dicarboxylic acids include malonic acid, substituted malonic acid, succinic acid, substituted succinic acid, maleic acid, substituted maleic acid, fumaric acid, substitured fumaric acid, alicylic dicarboxylic acids having the two carboxyl groups bonded to one carbon atom forming the ring, alicyclic dicarboxylic acids having the carboxyl groups bonded respectively to two adjacent carbon atoms forming the ring, aromatic dicarboxylic acids having the carboxyl groups at the ortho-position, and heterocyclic dicarboxylic acids having the carboxyl groups bonded to two adjacent carbon atoms forming the hetero ring.

More specific examples of the dicarboxylic acids include malonic acid; substituted malonic acids such as methylmalonic acid, ethylmalonic acid, isopropylmalonic acid, allylmalonic acid and phenylmalonic acid; succinic acid; substituted succinic acids such as methylsuccinic acid, dimethylsuccinic acid, ethylsuccinic acid methylethylsuccinic acid and itaconic acid; maleic acid; substituted maleic acids such as citraconic acid and dimethylmaleic acid; alicyclic dicarboxylic acids such as cyclopentane-1,1-dicarboxylic acid, cyclopentane-1,2-dicarboxylic acid, cyclohexane-1,2-dicarboxylic acid, cyclohexene-1,6-dicarboxylic acid, cyclohexene-3,4-dicarboxylic acid, cyclohexene-4,5-dicarboxylic acid, Nadic acid, methylNadic acid and 1-allylcyclohexane-3,4-dicarboxylic acid; aromatic dicarboxylic acids such as phthalic acid, naphthalene-1,2-dicarboxylic acid and naphthalene-2,3-dicarboxylic acid; and heterocyclic dicarboxylic acids such as 4,5-dihydrofurane2,3-dicarboxylic acid, benzopyrane-3,4-dicarboxylic acid, pyrrole-2,3-dicarboxylic acid, pyridine-2,3-dicarboxylic acid, thiophene-3,4-dicarboxylic acid and indole-2,3-dicarboxylic acid.

At least one of the alcohol components of the dicarboxylates described above preferably has at least 2 carbon atoms, particularly at least 3 carbon atoms. Above all, both alcohol components preferably have at least 2 carbon atoms, especially at least 3 carbon atoms. Examples of the ester are diethyl esters, diisopropyl esters, di-n-propyl esters, di-n-butyl esters, diisobutyl esters, di-tert-butyl esters, diisoamyl esters, di-n-hexyl esters, di-2-ethylhexyl esters, di-n-octyl esters, diisodecyl esters and ethyl n-butyl esters of the above-exemplified dicarboxylic acids.

Besides the diesters, oxygen-containing electron donors such as alcohols, phenols, ketones, aldehydes, carboxylic acids, organic or inorganic acid esters, ethers, acid amides and alkoxysilanes of acid anhydrides, and nitrogen-containing electron donors such as ammonia, amines, nitriles and isocyanates may be used for the preparation of the titanium catalyst component (A).

Specific examples include alcohols having 1 to 18 carbon atoms such as methanol, ethanol, propanol, pentanol, hexanol, octanol, dodecanol, octadecyl alcohol, benzyl alcohol, phenylethyl alcohol, cumyl alcohol and isopropyl benzyl alcohol; phenols containing 6 to 20 carbon atoms, which may have a lower alkyl group, such as phenol, cresol, xylenol, ethylphenol, propylphenol, nonylphenol, cumylphenol, and naphthol; ketones containing 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methylbenzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, gamma-butyrolactone, delta-valerolactone, coumarine, phthalide and ethylene carbonate; acid halides having 2 to 15 carbon atoms such as acetyl chloride, benzoyl chloride, toluoyl chloride and anisoyl chloride; ethers having 2 to 20 carbon atoms, such as methyl ether, ethyl ether, isopropyl ether, butyl ether, isoamyl ether, tetrahydrofuran, anisole and diphenyl ether; acid amides scch as acetamide, benzamide and toluamide; amines such as methylamine, ethylamine, diethylamine, tributylamine, piperidine, tribenzylamine, aniline, pyridine, picoline, tetramethylmethylenediamine and tetramethylethylenediamine; nitriles such as acetonitrile, benzonitrile and tolunitrile; organic phosphorus compounds having a P—O—O linkage such as trimethyl phosphite and triethyl phosphite; and alkoxysilanes such as ethyl silicate and diphenyldimethoxysilane. These electron donors may be used in combination.

Electron donors desirably included in the titanium catalyst component (A) are active hydrogen-free electron donors such as organic or inorganic acid esters, alkoxy(aryloxy)silane compounds, ethers, ketones, tertiary amines, acid halides and acid anhydrides. Organic acid esters and alkoxy(aryloxy)silane compounds are preferred. Especially preferred are esters of aromatic monocarboxylic acids with alcohols having 1 to 8 carbon atoms, and esters of dicarboxylic acids such as malonic acid, substituted malonic acid, substituted succinic acid, maleic acid, substituted maleic acid, 1,2-cyclohexanedicarboxylic acid and phthalic acid with alcohols having at least 2 carbon atoms. These electron donors do not always have to be used as raw materials in the preparation the titanium catalyst component (A). Compounds convertible to such electron donors may instead be used, and converted in the step of catalyst preparation.

The titanium catalyst component obtained by the above-illustrated methods may be purified by washing it sufficiently with a liquid inert hydrocarbon after the reaction. Examples of liquid inert hydrocarbons used for this purpose include aliphatic hydrocarbons such as n-pentane, isopentane, n-hexane, isohexane, n-heptane, n-octane, isooctane, n-decane, n-dodecane, kerosene and liquid paraffin; alicyclic hydrocarbons such as cyclopentane, methylcyclopentane, cyclohexane and methylcyclohexane; aromatic hydrocarbons such as benzene, toluene, xylene and cymene; halogenated hydrocarbons such as chlorobenzene and dichloroethane; and mixtures of these.

Magnesium compounds used to prepare the highly stereoregular catalyst component (A) are magnesium comounds with or without reducing ability. Examples of the former include magnesium compounds having a magnesium-carbon linkage or a magnesium-hydrogen linkage, such as dimethyl magnesium, diethyl magnesium, dipropyl magnesim, dibutyl magnesium, diamyl magnesium, dihexyl magnesium, didecyl magnesium, ethyl magnesium chloride, propyl magnesium chloride, butyl magnesium chloride, hexyl magnesium chloride, amyl magnesium chloride, butyl ethoxymagnesium, ethyl butyl magnesium and butyl magnesium hydride. These magnesium compounds may be used in the form of complexes with, for example, organoaluminum compounds, and may be in the form of a liquid or solid. Examples of the magnesium compounds having no reducing ability include magnesium halides such as magnesium chloride, magnesium bromide, magnesium iodide and magnesium fluoride; alkoxy magnesium halides such as methoxy magnesium chloride, ethoxy magnesium chloride, isopopoxy magnesium chloride, magnesium butoxy chloride and magnesium octoxy chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and magnesium carboxylates such as magnesium laurates and magnesium stearate. These magnesium compounds having no reducing ability may be those derived from the above magnesium compounds having reducing ability, or may be derived during preparation of the catalyst component. These magnesium compounds may be complexes or binary compounds with other metals, or mixtures with other metal compounds. They may also be a mixture of two or more of these compounds. The magnesium compounds having no reducing ability are preferred, and halogen-containing magnesium compounds, above all magnesium chloride, alkoxy magnesium chlorides and aryloxy magnesium chlorides, are especially preferred. Various titanium compounds are available in the preparation of the titanium catalyst component (A) used in this invention. Suitable examples are tetravalent titanium compounds represented by the formula Ti(Or)$_g$X$_{4-g}$ wherein
R represents a hydrocarbon group,
X represents a halogen atom, and $0 \leq g \leq 4$.

Specific examples are titanium tetrahalides such as TiCl$_4$, TiBr$_4$ and TiI$_4$; alkoxy titanium trihalides such as Ti(OCH$_3$)Cl$_3$, Ti(OC$_2$H$_5$)Cl$_3$, Ti(On-C$_4$H$_9$)Cl$_3$, Ti(OC$_2$H$_5$)Br$_3$ and Ti(Oiso-C$_4$H$_9$)Br$_3$; dialkoxy titanium dihalides such as Ti(OCH$_3$)$_2$Cl$_2$, Ti(OC$_2$H$_5$)$_2$Cl$_2$, Ti(On-C$_4$H$_9$)$_2$Cl$_2$ and Ti(OC$_2$H$_5$)$_2$Br$_2$; trialkoxy titanium monohalides such as Ti(OCH$_3$)$_3$Cl, Ti(OCphd 2H$_5$)Cl, Ti(On-C$_4$H$_9$)$_3$Cl and Ti(OCphd 2H$_5$)$_3$Br; and tetraalkoxy titaniums such as Ti(OCH$_3$)$_4$, Ti(OC$_2$H$_5$)$_4$ and Ti(On-C$_4$H$_9$)$_4$. Halogen-containing titanium compounds, particularly titanium tetrahalides, are preferred among them. These titanium compounds may be used singly or as a mixture, or as a dilution in a hydrocarbon or a halogenated hydrocarbon. In the preparation of the titanium catalyst component (A), the amounts of the titanium compound, the magnesium compound and the electron donor to be deposited, and as optional components, the other electron donors (e.g., alcohols, phenols, monocarboxylic acid esters), a silicon compound and an aluminum compound vary depending upon the method of preparation, and cannot be definitely determined. For example, the amount of the electron donor to be deposited is about 0.1 to about 10 moles per mole of the magnesium compound, and the amount of the titanium compound is about 0.05 to about 1000 moles per mole of the magnesium compound.

In the present invention, a catalyst comprising the highly stereoregular titanium catalyst component (A) obtained as above, the organoaluminum compound (B) and the electron donor (C) is used.

Examples of the component (B) are (i) organoaluminum compounds containing one Al-carbon bond at least in the molecule, for example organoaluminum compounds represented by the general formula R$_m^1$Al(OR$^2$)$_n$H$_p$X$_q$ wherein R$^1$ and R$^2$ are hydrocarbon groups usually containing 1 to 15 carbon atoms, preferably 1 to 4 carbon atoms, which may be identical or different, X represents halogen, $0 < m \leq 3$, $0 \leq n < 3$, $0 \leq p < 3$, $0 \leq q < 3$, and $m+n+p+q=3$, and

(ii) complex alkylated products of metals of Group I and aluminum which are represented by the general formula M$^1$AlR$_4^1$ wherein M$^1$ represents Li, Na or K, and R$^1$ is as defined above.

Examples of the organoaluminum compounds which come under (i) are given below.

Compounds of the general formula

M$_m^1$Al(OR$^2$)$_{3-m}$ wherein
R$^1$ and R$^2$ are as defined above, and m is preferably from 1.5 to 3,
compounds of the general formula R$_m^1$AlX$_{3-m}$ wherein R$^1$ is as defined above, X is halogen and m is preferably a number represented by $0 < m < 3$,
compounds represented by the general formula R$_m^1$AlX$_{3-m}$ wherein $R^1$ is as defined above, and m is preferably a number represented by $2 \leq m < 3$, and
compounds represented by the general formula $$R_m^1 Al(OR^2)_n X_q$$

wherein $R^1$ and $R^2$ are as defined above, X is halogen, $0 < m \leq 3$, $0 \leq n < 3$, $0 \leq q < 3$, and $m+n+q=3$.

Specific examples of the aluminum compounds coming under (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having the average composition $R_{2.5}^1 Al(OR^2)_{0.5}$; dialkylaluminum halides such as diethy aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides; partially hydrogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxy chloride, butyl aluminum butoxy chloride and ethyl aluminum ethoxy bromide.

$LiAl(C_2H_5)_4$ and $LiAl(C_7H_{15})_4$ may be cited as examples of compounds belonging to (ii).

As compounds similar to (i), there may also be used organoaluminum compounds in which two or more aluminums are bonded through an oxygen or nitrogen atom. Examples are $(C_2H_5)_2AlOAl(C_2H_5)_2$, $(C_4H_9)_2AlOAl(C_4H_9)_2$, and $$(C_2H_5)_2AlNAl(C_2H_5)_2.$$
$$|$$
$$C_2H_5$$

Among the above aluminum compounds, trialkyl aluminums and alkyl aluminums in which two or more aluminums are bonded are preferred.

Examples of the electron donor (C) used as a catalyst ingredient in this invention include amines, amides, ethers, ketones, nitriles, phosphines, stibines, arsines, phosphoramides, esters, thioethers, thioesters, acid anhydrides, acid halides, aldehydes, alcoholates, alkoxy(aryloxy)silanes, organic acids, and amides and salts of metals of Groups I to IV of the periodic table. The salts may be formed in situ by the reaction of organic acids with the organometal compounds used as the catalyst component (B). Specific examples of these may be selected from the examples of the electron donors included in the titanium catalyst component (A). Good results are obtained when organic acid esters, alkoxy(aryloxy)silane compounds, ethers, ketones, acid anhydrides and amines are used. When the electron donor in the titanium catalyst component (A) is a monocarboxylic acid ester, the electron donor (C) is desirably an alkyl ester of an aromatic carboxylic acid.

When the electron donor in the titanium catalyst component (A) is the ester of a dicarboxylic acid and an alcohol having at least 2 carbon atoms cited hereinabove as a preferred example, it is preferred to use an alkoxy(aryloxy)silane compound represented by the general formula $R_nSi(OR^1)_{4-n}$ wherein R and $R^1$ are hydrocarbon groups and $0 \leq n \leq 4$ or an amine having great steric hindrance as the component (C). Specific examples of the alkoxy(aryloxy)silane compound of the above formula include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, vinyltrimethoxysilane, methyltrimethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gamma-aminopropyltriethoxysilane, chlorotriethoxysilane, ethyltriisopropoxysilane, vinyltributoxysilane, ethyl silicate, butyl silicate, trimethylphenhoxysilane, methyltriallyloxysilane, vinyltris(beta-methoxysilane), vinyltriacetoxysilane and dimethyltetraethoxydisiloxane. Above all, trimethylmethoxysilane, trimethylethoxysilane, trimethyl-n-propoxysilane, triethylmethoxysilane, tri-n-propylmethoxysilane, tri-iso-propylmethoxysilane and triphenylmethoxysilane are preferred.

Examples of particularly suitable amines having great steric hindrance are 2,2,6,6-tetramethylpiperidine, 2,2,5,5-tetramethylpyrrolidine, derivatives of these, and tetramethylmethylenediamine.

In the process of this invention, a branched alpha-olefin containing 5 to 10 carbon atoms and having a branch at the 3-position or a position of a higher number or a mixture of it with a linear alpha-olefin containing 2 to 20 carbon atoms is polymerized or copolymerized in a multiplicity of polymerization steps using the catalyst described above.

In the present invention, pre-polymerization may be carried out before the polymerization or copolymerization is carried out in a multiplicity of steps.

Before the above branched alpha-olefin is polymerized, or the above branched alpha-olefin and the linear alpha-olefin are copolymerized, in the presence of the catalyst formed from the components (A), (B) and (C), it is preferred to pre-polymerize the branched alpha-olefin at a rate of about 1 to about 1000 g per millimole of titanium in a hydrocarbon medium using the component (A), at least part of the component (B) and at least part of component (C). This pre-polymerization treatment permits preparation of a large powdery polymer having a high bulk density in slurry polymerization to be subsequently carried out. Thus, it has the advantage that the properties of slurry are good and the process can be operated at a high concentration. A further advantage is that the yield of the polymer per unit weight of the catalyst is large, and a stereoregular polymer can be produced in a high yield.

The branched alpha-olefin to be used in pre-polymerization is an alpha-olefin containing 5 to 10 carbon atoms and having a branch at the 3-position or a position of a higher number, which may be the same as the branched alpha-olefin used in the main polymerization. The pre-polymerization is preferably carried out under relatively mild conditions and under conditions such that the pre-polymer does not dissolve in the polymerization medium. For this purpose, the polymerization medium is preferably an inert hydrocarbon, for example an aliphatic hydrocarbon such as butane, pentane, hexane, heptane, oxtane, decane, dodecane and kerosene, or an alicyclic hydrocarbon such as cyclopentane and cyclohexane.

In the pre-polymerization, the titanium catalyst component (A) is used preferably in a proportion of about 0.5 to about 100 millimoles, particularly about 1 to about 10 millimoles, per liter of the hydrocarbon medium; the organoaluminum compound (B) is used preferably in such an amount that the Al/Ti atomic ratio is from about 1 to about 100, particularly from about 2 to about 80; and the electron donor (C) is used preferably in an amount of about 0.01 to about 2 moles, particularly about 0.01 to about 1 mole, per mole of the component (B).

The amount of the branched alpha-olefin pre-polymerized is about 1 to about 1000 g, preferably about 3 to about 500 g, per millimole of titanium in the catalyst component (A). To obtain the above amount of the pre-polymerized branched alpha-olefin, a predetermined amount of the branched alpha-olefin is used. Preferably, the concentration of the branched alpha-olefin in the pre-polymerization is not more than 10 moles, particularly not more than about 5 moles, per liter of the hydrocarbon medium.

Desirably, the pre-polymerization is carried out at a temperature at which the resulting prepolymer does not dissolve the hydrocarbon medium. It differs depending upon the type of the hydrocarbon medium, but may, for example, be about −20° C. to about +70° C., preferably about 0° C. to about 50° C.

The process of this invention is carried out by polymerizing the branched alpha-olefin or copolymerizing the branched alpha-olefin and the linear alpha-olefin in a multiplicity of steps using the catalyst subjected to the above pre-polymerization treatment. At this time, the component (B) and/or the component (C) may additionally be used. Preferably, about 1 to about 1000 moles, particularly about 10 to about 1000 moles, per mole of titanium, of the component (B) and about 0.005 to about 3 moles, particularly about 0.01 to about 1 mole, per mole of the component (B) of the component (C) are additionally used.

In the present invention, the starting olefins may be polymerized in a multiplicity of stages in the presence of the catalyst subjected to pre-polymerization treatment using the alpha-olefin.

The catalyst subjected to pre-polymerization shows greater polymerization activity in the multiple polymerization steps in this invention and gives a branched alpha-olefinic polymer composition having increased stereoregularity.

In at least one polymerization step in the process of this invention, a branched alpha-olefin containing 5 to 10 carbon atoms and having a branch at the 3-position or a position of a higher number or a mixture of it with a linear alpha-olefin containing 2 to 20 carbon atoms is polymerized or copolymerized in the presence of the above catalyst in an inert solvent or in the absence of solvent to give a branched alpha-olefinic polymer [I] having an intrinsic viscosity $[\eta]_H$, measured in decalin at 135° C., of 5 to 30 dl/g, preferably 6 to 30 dl/g, more preferably 8 to 30 dl/g.

In at least one other polymerization step in the process of this invention, a branched alpha-olefin containing 5 to 10 carbon atoms and having a branch at the 3-position or a position of a higher number or a mixture of it with a linear alpha-olefin containing 2 to 20 carbon atoms is polymerized or copolymerized in the presence of the above catalyst and hydrogen in an inert catalyst or in the absence of solvent to give a branched alpha-olefinic polymer [II] having an intrinsic viscosity $[\eta]_L$, measured in decalin at 135° C., of 1 to 10 dl/g, preferably 1 to 8 dl/g, more preferably 1 to 6 dl/g.

In the above polymerization steps, the branched alpha-olefin and the linear alpha-olefin are polymerized or copolymerized in such proportions that the resulting branched alpha-olefinic polymer compositions is composed of 80 to 100 mole % of units (A) derived from the branched alpha-olefin and 0 to 20 mole % of units (B) derived from the linear alpha-olefin. Such proportions depend upon the types of the alpha-olefins used, the catalyst, the reaction conditions, etc., but can be easily determined by a simple experiment.

Preferably, the concentrations of the individual components of the catalyst in the polymer solution in the polymerization vessel in each of the polymerization steps are such that the proportion of the aforesaid treated catalyst is about 0.001 to about 0.1 millimole, preferably about 0.001 to about 0.05 millimole as titanium atom per liter of the volume of the polymerization vessel, and the Al/Ti atomic ratio in the polymerization system is from about 1 to about 1000, preferably from about 2 to about 1000. As required, the organoaluminum compound (B) may be additionally used for this purpose. Hydrogen, an electron donor, and a halogenated hydrocarbon may be present in the polymerization system in order to adjust the molecular weight and the molecular weight distribution of the polymer.

The polymerization temperature in each of the polymerization steps is preferably within a range in which slurry polymerization, solution polymerization or vapor-phase polymerization can be carried out and within the range of at least about 0° C., preferably about 30 to about 200° C. The polymerization pressure that can be recommended is, for example, atmospheric pressure to about 200 kg/cm², especially atmospheric pressure to about 100 kg/cm². Desirably, the polymerization time is prescribed such that the amount of the polymer formed is at least 5000 g, particulary at least about 10000 g, per millimole of titanium in the titanium catalyst component (A).

In one specific embodiment the process of the invention is carried out as follows.

In at least one polymerization step in this invention, a branched alpha-olefin containing 5 to 10 carbon atoms and having a branch at the 3-position or a position of a higher number or a mixture of it with a linear alpha-olefin containing 2 to 20 carbon atoms in the presence of the above catalyst in an inert solvent or in the absence of solvent under such conditions that the branched alpha-olefin forms a liquid phase, thereby to form a branched olefinic polymer [I] liquid-phase polymerization step (a)]. This liquid-phase polymerization step (a) may be composed of one or a plurality of stages. In the liquid-phase polymerization step (a), a branched alpha-olefinic polymer [I] is formed which has an intrinsic viscosity $[\eta]_H$, measured in decalin at 135° C., of 5 to 30 dl/g, preferably 6 to 30 dl/g, more preferably 8 to 30 dl/g.

In the polymerization step (a), the monomers are polymerized or copolymerized in such proportions that the resulting branched alpha-olefinic polymer [I] is composed of 80 to 100 mole % of (A) units derived from the branched alpha-olefin and 0 to 20 mole % of (B) recurring units derived from the linear alpha-olefin.

Such proportions depend upon the types of the alpha-olefins used, the catalyst, the reaction conditions, etc., but can be easily determined by a simple experiment.

The proportions of the branched olefinic polymer [I] formed in the liquid-phase polymerization step (a) and a branched alpha-olefinic polymer [II] formed in a vapor-phase polymerization step (b) to be described are experimentally determined so that the ratio of the polymer [I]/polymer [II] is from 1/99 to 60/40, preferably from 2/98 to 50/50, more preferably from 5/90 to 50/50.

Preferably, the concentrations of the individual components of the catalyst in the polymer solution in the polymerization vessel in the liquid-phase polymerization step (a) are such that the proportion of the aforesaid treated catalyst is about 0.001 to about 0.1 millimole, preferably about 0.001 to about 0.05 millimole as titanium atom per liter of the volume of the polymerization vessel, and the Al/Ti atomic ratio in the polymerization system is from about 1 to about 1000, preferably from about 2 to about 1000. As required, the organoaluminum compound (B) may be additionally used for this purpose. Hydrogen, an electron donor, and a halogenated hydrocarbon may be present in the polymerization system in order to adjust the molecular weight and the molecular weight distribution of the polymer. In the liquid-phase polymerization step (a), slurry polymerization or solution polymerization is carried out. Preferably, it is carried out by slurry polymerization. The polymerization temperature is preferably within a range in which slurry polymerization or solution polymerization can be carried out and within the range of at least about 0° C., preferably about 30 to about 200° C. The polymerization pressure that can be recommended is, for example, atmospheric pressure to about 200 kg/cm$^2$, especially atmospheric pressure to about 100 kg/cm$^2$. Desirably, the polymerization time is prescribed such that the amount of the polymer formed is at least 5000 g, particularly at least about 10000 g, per millimole of titanium in the titanium catalyst component (A).

In the liquid-phase polymerization steps, the polymerization or copolymerization of the branched alpha-olefin or a mixture of it with the linear alpha-olefin is carried out in the presence or absence of an inert medium. Preferably, it is carried out in the presence of a branched alpha-olefin in an amount sufficient to serve as a medium. Examples of the inert medium will be given hereinafter.

In the process of this invention, a branched alpha-olefin containing 5 to 10 carbon atoms and having a branch at the 3-position or a position of a higher number or a mixture of it with a linear alpha-olefin containing 2 to 20 carbon atoms is polymerized or copolymerized in the presence of the branched alpha-olefinic polymer [I] formed in the liquid-phase polymerization step (a) and hydrogen using the above catalyst in an inert solvent or in the absence of solvent under such conditions that the branched alpha-olefin forms a vapor phase [vapor-phase polymeization step (b)]. This step gives a branched alpha-olefinic polymer [II] having an intrinsic viscosity [$\eta$]$_L$, measured in decalin at 135° C., of 1 to 10 dl/g, preferably 1 to 8 dl/g, more preferably 1 to 6 dl/g. The vapor-phase polymerization step (b) may be comprised of one or a plurality of stages.

In the vapor-phase polymerization step (b), the monomers are polymerized or copolymerized in such proportions that the resulting branched alpha-olefinic polymer [II] is composed of 80 to 100 mole % of (A) units derived from the branched alpha-olefin and 0 to 20 mole % of (B) recurring units derived from the linear alpha-olefin.

Such proportions depend upon the types of the alpha-olefins used, the catalyst, the reaction conditions, etc., but can be easily determined by a simple experiment.

Preferably, the concentrations of the individual components of the catalyst in the polymer solution in the polymerization vessel in the vapor-phas polymerization step (b) are such that the proportion of the aforesaid treated catalyst is about 0.001 to about 0.1 millimole, preferably about 0.001 to about 0.05 millimole as titanium atom per liter of the volume of the polymerization vessel, and the Al/Ti atomic ratio in the polymerization system is from about 1 to about 1000, preferably from about 2 to about 1000. As required, the organoaluminum compound (B) may be additionally used for this purpose. Hydrogen, an electron donor, and a halogenated hydrocarbon may be present in the polymerization system in order to adjust the molecular weight and the molecular weight distribution of the polymer.

The polymerization temperature in the vaporphase polymerization step (b) is preferably within a range in which vapor-phase polymerization can be carried out and within the range of at least about 0° C., preferably about 30 to about 200° C. The polymerization pressure that can be recommended is, for example, atmospheric pressure to about 200 kg/cm$^2$, especially atmospheric pressure to about 100 kg/cm$^2$ Desirably, the polymerization time is prescribed such that the amount of the polymer formed is at least 5000 g, particularly at least about 10000 g, per millimole of titanium in the titanium catalyst component (A).

Examples of preferred branched alpha-olefins containing 5 to 10 carbon atoms and having a branch at the 3-position or a position of a higher number which can be used in this invention are 3-methyl-1-pentene, 4-methyl-1-pentene, 3-methyl-1-butene, 3,3-dimethyl-1butene, 4,4-dimethyl-1-hexene, 3-methyl-1-hexene, 4,4-dimethyl-1-pentene, 3-ethyl-pentene and vinylcyclohexane. 4-Methyl-1-pentene especially is preferred.

Examples of preferred linear alpha-olefins containing 2 to 20 which can be used in this invention are ethylene, propylene, 1-butene, 1-pentene, 1-hexene, 1-octene, 1-decene and 1-dodecene. Linear alpha-olefins having 6 to 14 carbon atoms such as 1-hexene, 1-octenete, 1-decene, 1-dodecene and 1-tetradecene are especially preferred.

Examples of the inert solvent that can be used in the polymerization steps of forming the branched alpha-olefinic polymers [I] and [II] include aliphatic hydrocarbons such as propane, butane, pentane, hexane, heptane, octane, decane and kerosene, alicyclic hydrocarbons such as cyclopentane and cyclohexane, aromatic hydrocarbons such as benzene, toluene and xylene, halogenated hydrocarbons such as dichloroethane, methylene chloride and chlorobenzene, and mixtures of these. Of these, aliphatic hydrocarbons are particularly preferred.

The branched alpha-olefinic polymer composition obtained by this invention has better melt flowability, moldability and melt tension than branched alpha-olefinic polymers and branched alpha-olefinic polymer compositions obtained by conventional methods.

Accordingly, the branched alpha-olefinic polymer composition obtained by this invention may be molded into films, sheets, hollow containers and other various articles by, for example, extrusion, blow molding, injection molding, compression molding and vacuum forming. These articles can find extensive use in various applications.

The present invention thus gives a branched alpha-olefinic polymer composition having excellent melt flowability, good moldability and excellent melt tension and a process for producing this composition in a multiplicity of polymerization steps in the presence of a highly active catalyst.

EXAMPLE 1

Preparation of a titanium catalyst component (A)

Anhydrous magnesium chloride (4.76 g; 50 mmoles), 25 ml of decane and 23.4 ml (150 mmoles) of 2-ethylhexyl alcohol were heated at 130° C. for 2 hours to form a uniform solution. Phthalic anhydride (1.11 g; 7.5 mmoles) was added to the solution, and the mixture was stirred at 130° C. for 1 hour to dissolve phthalic anhydride uniformly in the solution. The resulting uniform solution was cooled to room temperature, and entirely added dropwise to 200 ml (1.8 moles) of titanium tetrachloride kept at −20° C. over the course of 1 hour. After the addition, the temperature of the mixed solution was raised to 110° C. over 4 hours, and when the temperature reached 110° C., 2.68 ml (12.5 mmoles) of diisobutyl phthalate was added. The mixture was stirred at this temperature for 2 hours. After the 2-hour reaction, the solid portion was collected by filtration. The solid portion was suspended in 200 ml of TiCl$_4$, and heated at 110° C. for 2 hours. After the reaction, the solid portion was collected by hot filtration. The solid portion was thoroughly washed with decane and hexane at 110° C. until no free titanium compound was detected in the washings. The titanium catalyst component (A) synthesized by the above method was stored as a hexane slurry. Part of it was dried for the purpose of examining the composition. The resulting titanium catalyst component (A) comprises 3.1% by weight of titanium, 56.0% by weight of chlorine, 17.0% by weight of magnesium and 20.9% by weight of diisobutyl phthalate.

Pre-polymerization

A 1000 ml flask was charged with 500 ml of n-decane, 5 mmoles of triethyl aluminum, 1 mmoles of trimethylmethoxysilane and 0.5 mmole, calculated as titanium atom, of the titanium catalyst component (A). While maintaining the temperature at 20° C., 150 g of 4-methyl-1-pentene was added over the course of 1 hour and reacted further for 2 hours at 20° C. Ten grams of 2-methyl-1-pentene was added at a time and reacted at 20° C. for 2 hours. The reaction product was filtered through a glass filter, and suspended in 500 ml of n-decane. The amount of the product obtained by the pre-polymerization was 300 g per mmole of titanium.

Polymerization

A 17-liter thoroughly nitrogen-purged stainless steel (SUS) reactor was charged with 14 litters of 4-methyl-1-pentene, 270 ml of 1-decene, 10 mmoles of triethyl aluminum, 10 mmoles of trimethylmethoxysilane and 0.02 mmole as titanium atom of the components subjected to the pre-polymerization (which had been dehydrated and purged with nitrogen). The polymerization was carried out at 50° C. for 2 hours. The polymer slurry was partly withdrawn, and the amount of the polymer formed at this stage excepting the solvent-soluble polymer and its molecular weight were measured. It was found that polymer [I] having an $[\eta]_H$ of 13.5 dl/g was formed in an amount of 31,600 per mmole of titanium. Subsequently, hydrogen was added until its partial pressure reached 2 atmospheres. The polymerization was further carried out for 6 hours at 50° C. (during which time polymer [II] was formed). The polymerization was stopped by adding a small amount of isobutyl alcohol. The reaction mixture was cooled to room temperature, and the solvent was removed by a centrifugal separater. The residue was dried in vacuum to give 2,940 g of a white powdery polymer. The finally obtained polymer composition (excepting the solvent-soluble polymer) had an [η] of 6.42 dl/g, and its amount formed was 147,000 g per mmole of titanium.

It was therefore found that the polymer obtained by the above polymerization reaction was composed of polymer [I] having an $[\eta]_H$ of 13.5 dl/g and polymer [II] having an of 3.37 dl/g, and the weight ratio of the polymer [I] to the polymer [II] was 21.5:88.5.

The resulting polymer was mixed with a suitable amount of an antioxidant, and the mixture was granulated by extrusion at a resin temperature of about 260° C. with a residence time of about 2 minutes to provide a MFR of about 30 g/10 minutes. The properties of the granules were measured, and the results are shown in Table 2.

In the following Examples and Comparative Examples, the properties of the polymers were measured after their MFR values were adjusted as indicated above.

COMPARATIVE EXAMPLE 1

The same branched alpha-olefin and linear alpha-olefin as used in Example 1 were polymerized as in Example 1 in the presence of the same catalyst components as in Example 1 at 50° C. for 6.5 hours under a hydrogen pressure of 0.7 atms. A polymer was obtained in an amount of 193,000 g per mmole of titanium. The properties of the polymer are shown in Table 2.

EXAMPLES 2–5

Example 1 was repeated except that the hydrogen pressure and the polymerization time in the first step (of forming polymer [I]) and the second step (of forming polymer [II]) were changed as shown in Table 1. The results of the polymerization and the properties of the resulting polymers are shown in Table 2.

EXAMPLES 6–7

Example 1 was repeated except that the linear alpha-olefin was not used, and the polymerization temperature, hydrogen partial pressure and polymerization time in the first and second steps were changed as shown in Table 1. The results of the polymerization and the properties of the resulting polymers are shown in Table 2.

EXAMPLES 8–9

Example 1 was repeated except that the linear alpha-olefin was used only in the second step, and the hydrogen partial pressure and polymerization time in the first and second steps were changed as shown in Table 1. The results of the polymerization and the properties of the resulting polymers are shown in Table 2.

COMPARATIVE EXAMPLES 2–5

Example 1 was repeated except that the amount of the liner alpha-olefin used, the hydrogen partial pressure, the polymerization temperature and the polymerization time in the first and second steps were changed as shown in Table 1. The results of the polymerization and the properties of the resulting polymers are shown in Table 2.

EXAMPLES 10–11

Example 1 was repeated except that 1-hexene and 1-tetradecene were used respectively in the amounts indicated in Table 1. The results of the polymerization and the properties of the polymers are shown in Table 2.

EXAMPLES 12–14

Example 1 was repeated except that diethyl phthalate, di-n-propyl phthalate and di-n-butyl phthalate were used respectively instead of diisobutyl phthalate. The results of the polymerization and the properties of the polymers are shown in Table 2.

EXAMPLES 15–17

Example 1 was repeated except that trimethylethoxysilane, triethylmethoxysilane and trimethyl-n-propoxysilane were used respectively instead of trimethylmethoxysilane. The results of the polymerization and the properties of the polymers are shown in Table 2.

EXAMPLES 18–19

Example 1 was repeated except that triisobutyl aluminum and tri-n-hexyl aluminum were used respectively instead of triethyl aluminum. The results of the polymerization and the properties of the polymers are shown in Table 2.

TABLE 1

| | | Polymerization conditions | | | | | | | |
|---|---|---|---|---|---|---|---|---|---|
| | | First step | | | | | Second step | | |
| | | Amount of 4-methyl-1-penten used (liters) | Amount of the linear alpha-olefin used (ml) | Hydrogen partial pressure (atm) | Temperature (°C.) | Time (hr) | Amount of the linear alpha-olefin newly added (ml) | Hydrogen partial pressure (atm) | Temperature (°C.) | Time (hr) |
| Example | 1 | 14 | 1-decene, 270 | — | 50 | 2 | — | 2 | 50 | 6 |
| | 2 | " | " | — | 50 | 0.5 | — | 2 | 50 | 7.5 |
| | 3 | " | " | — | 50 | 1 | — | 2 | 50 | 7 |
| | 4 | " | " | 0.1 | 50 | 2 | — | 1.9 | 50 | 5 |
| | 5 | " | " | — | 50 | 2 | — | 2 | 50 | 5.5 |
| | 6 | " | — | — | 30 | 0.5 | — | 9 | 55 | 6 |
| | 7 | " | — | — | 50 | 2 | — | 2 | 50 | 6 |
| | 8 | " | — | — | 50 | 1.5 | — | 2 | 50 | 6.5 |
| | 9 | " | — | 2 | 50 | 1.5 | | — | 50 | 4.5 |
| | 10 | " | 1-hexene, 200 | — | 50 | 2 | — | 2 | 50 | 6 |
| | 11 | " | 1-tetradecene, 200 | — | 50 | 2 | — | 2 | 50 | 6 |
| | 12 | " | 1-decene, 270 | — | 50 | 2 | — | 2 | 50 | 6 |
| | 13 | " | 1-decene, 270 | — | 50 | 2 | — | 2 | 50 | 6 |
| | 14 | " | " | — | 50 | 2 | — | 2 | 50 | 6 |
| | 15 | " | " | — | 50 | 2 | — | 2 | 50 | 6 |
| | 16 | " | " | — | 50 | 2 | — | 2 | 50 | 6 |
| | 17 | " | " | — | 50 | 2 | — | 2 | 50 | 6 |
| | 18 | " | " | — | 50 | 2 | — | 2 | 50 | 6 |
| | 19 | " | " | — | 50 | 2 | — | 2 | 50 | 6 |
| Comparative Example | 1 | " | 1-decene, 270 | 0.7 | 50 | 6.5 | — | — | — | — |
| | 2 | " | — | — | 50 | 0.5 | — | 15 | 60 | 6 |
| | 3 | " | 1-decene, 270 | 0.5 | 50 | 2 | — | 2 | 50 | 4 |
| | 4 | " | — | — | 30 | 5 | — | — | 60 | 3 |
| | 5 | " | — | 0.5 | 50 | 5 | — | 20 | 60 | 7 |

TABLE 2

| | Results of polymerization | | | | | | | | | |
|---|---|---|---|---|---|---|---|---|---|---|
| | | Polymer [I] | | | | Polymer [II] | | | | |
| | Amount of the polymer yielded (g/mole Ti) | $[\eta]_H$ (dl/g) | Amount polymerized (wt %) | Branched alpha-olefin (mole %) | Linear alpha-olefin (mole %) | $[\eta]_L$ (dl/g) | Amount polymerized (wt %) | Branched alpha-olefin (mole %) | Linear alpha-olefin (mole %) | $[\eta]_H/[\eta]_L$ |
| Example | | | | | | | | | | |
| 1 | 147,000 | 13.5 | 21.5 | 98.0 | 2.0 | 3.97 | 88.5 | 98.6 | 1.4 | 3.4 |
| 2 | 154,000 | 14.5 | 5.5 | 97.7 | 2.3 | 2.70 | 94.5 | 98.4 | 1.6 | 5.4 |
| 3 | 144,500 | 17.1 | 10.7 | 97.9 | 2.1 | 2.83 | 89.3 | 98.3 | 1.7 | 6.0 |
| 4 | 172,300 | 9.0 | 54.2 | 97.9 | 2.1 | 4.06 | 45.8 | 98.3 | 1.7 | 2.2 |
| 5 | 136,600 | 14.5 | 28.3 | 97.7 | 2.3 | 5.04 | 71.7 | 98.1 | 1.9 | 2.9 |
| 6 | 119,000 | 29.6 | 5.1 | 100 | — | 1.15 | 94.9 | 100 | — | 26 |
| 7 | 150,700 | 14.1 | 34.4 | 100 | — | 4.85 | 65.6 | 100 | — | 2.9 |
| 8 | 144,000 | 14.4 | 12.3 | 100 | — | 2.31 | 87.7 | 98.5 | 1.5 | 6.2 |
| 9 | 165,000 | 15.2 | 52.4 | 100 | — | 2.51 | 47.6 | 98.3 | 1.7 | 6.1 |
| 10 | 157,000 | 13.1 | 22.3 | 97.0 | 3.0 | 4.10 | 77.7 | 97.6 | 2.4 | 3.2 |
| 11 | 161,000 | 14.3 | 25.1 | 98.5 | 1.5 | 3.85 | 74.9 | 98.8 | 1.2 | 3.7 |
| 12 | 86,100 | 13.9 | 16.4 | 98.2 | 1.8 | 4.40 | 83.6 | 98.6 | 1.4 | 3.2 |
| 13 | 142,700 | 14.4 | 18.1 | 98.0 | 2.0 | 4.19 | 81.9 | 98.4 | 1.6 | 3.4 |
| 14 | 153,600 | 14.7 | 20.5 | 98.0 | 2.0 | 4.47 | 79.5 | 98.4 | 1.6 | 3.3 |
| 15 | 176,600 | 13.8 | 22.7 | 98.0 | 2.0 | 5.40 | 77.3 | 98.5 | 1.5 | 2.6 |
| 16 | 120,100 | 14.5 | 19.4 | 98.0 | 2.0 | 4.21 | 80.6 | 98.5 | 1.5 | 3.4 |
| 17 | 137,200 | 13.6 | 19.2 | 98.1 | 1.9 | 4.28 | 80.8 | 98.6 | 1.4 | 3.2 |
| 18 | 143,300 | 15.1 | 20.7 | 97.9 | 2.1 | 5.05 | 79.3 | 98.4 | 1.6 | 3.0 |
| 19 | 146,200 | 15.3 | 21.2 | 99.8 | 2.1 | 5.22 | 78.8 | 98.4 | 1.6 | 2.9 |

TABLE 2-continued

| Comparative Example | | | | | | | | | | |
|---|---|---|---|---|---|---|---|---|---|---|
| 1 | 193,000 | — | — | — | — | — | — | — | — | — |
| 2 | 95,000 | 14.8 | 5.1 | 100 | — | 0.33 | 94.9 | 100 | — | — |
| 3 | 173,000 | 5.61 | 35.3 | 97.9 | 2.1 | 3.95 | 64.7 | 98.5 | 1.5 | 42 |
| 4 | 94,000 | 29.1 | 59.3 | 100 | — | 12.7 | 40.7 | 100 | — | 1.4 |
| 5 | 24,000 | 5.10 | 5.2 | 100 | — | 0.21 | 94.8 | 100 | — | 2.3 |
|   |         |      |     |     |   |      |      |     |   | 18 |

| | Results of polymerization — Polymer composition finally obtained | | | | Decane |
|---|---|---|---|---|---|
| | $[\eta]$ (dl/g) | Linear alpha-olefin content (mole %) | $MFR^{5kg}_{260°C}/MFR^{1kg}_{260°C}$ | $\overline{Mw}/\overline{Mn}$ | soluble content (wt %) |
| Example | | | | | |
| 1 | 6.42 | 1.7 | 14.8 | 6.5 | 3.5 |
| 2 | 3.35 | 1.6 | 20.2 | 8.1 | 3.5 |
| 3 | 4.36 | 1.7 | 17.8 | 6.8 | 4.1 |
| 4 | 6.74 | 1.9 | 12.3 | 4.9 | 4.3 |
| 5 | 7.72 | 2.0 | 16.2 | 6.5 | 4.8 |
| 6 | 2.60 | — | 24.3 | 9.3 | 4.9 |
| 7 | 8.03 | — | 15.9 | 6.5 | 2.9 |
| 8 | 3.80 | 1.5 | 15.2 | 6.4 | 3.2 |
| 9 | 9.16 | 1.7 | 23.8 | 8.8 | 3.0 |
| 10 | 6.11 | 2.5 | 14.5 | 5.7 | 4.2 |
| 11 | 6.47 | 1.3 | 16.5 | 6.6 | 4.3 |
| 12 | 5.96 | 1.5 | 17.1 | 7.3 | 12.5 |
| 13 | 6.04 | 1.7 | 15.3 | 6.6 | 5.4 |
| 14 | 6.57 | 1.7 | 14.7 | 6.5 | 3.2 |
| 15 | 7.31 | 1.6 | 16.5 | 7.0 | 6.1 |
| 16 | 6.21 | 1.6 | 16.1 | 6.0 | 4.3 |
| 17 | 6.07 | 1.5 | 17.8 | 7.1 | 10.6 |
| 18 | 7.13 | 1.7 | 15.1 | 6.1 | 3.7 |
| 19 | 7.36 | 1.7 | 15.8 | 6.4 | 3.9 |
| Comparative Example | | | | | |
| 1 | 4.42 | 1.6 | 8.8 | 3.9 | 2.6 |
| 2 | 1.03 | — | — | — | 5.8 |
| 3 | 4.54 | 1.7 | 9.2 | 4.2 | 2.3 |
| 4 | 22.4 | — | 12.5 | 5.2 | 4.7 |
| 5 | 0.46 | — | — | — | 9.5 |

EXAMPLES 20-22

Preparation of a titanium catalyst component (A)

Anhydrous magnesium chloride (4.76 kg; 50 moles), 25 liters of decane and 23.4 liters (150 moles) of 2-ethylhexyl alcohol were heated at 130° C. for 2 hours to form a uniform solution. Phthalic anhydride (1.11 kg; 7.5 moles) was added to the solution, and the mixture was stirred at 130° C. for 1 hour to dissolve phthalic anhydride uniformly in the solution. The resulting uniform solution was cooled to room temperature, and entirely added dropwise to 200 liters (1800 moles) of titanium tetrachloride kept at −20° C. over the course of 1 hour. After the addition, the temperature of the mixed solution was raised to 110° C. over 4 hours, and when the temperature reached 110° C., 2.68 liters (12.5 moles) of diisobutyl phthalate was added, and the mixture was stirred at this temperature for 2 hours. After the 2-hour reaction, the solid portion was collected by filtration. The solid portion was suspended in 200 liters of TiCl₄, and heated at 110° C. for 2 hours. After the reaction, the solid portion was collected by hot filtration. The solid portion was thoroughly washed with decane and hexane at 110° C. until no free titanium compound was detected in the washings. The titanium catalyst component (A) synthesized by the above method was stored as a hexane slurry. Part of it was dried for the purpose of examining the composition. The resulting titanium catalyst component (A) contained 3.1% by weight of titanium, 56.0% by weight of chlorine, 17.0% by weight of magnesium and 20.9% by weight of diisobutyl phthalate.

Pre-polymerization

A 50-liter reactor equipped with a stirrer was charged with 25 liters of n-decane, 250 mmoles of triethyl aluminum, 50 mmoles of trimethylmethoxysilane and 250 mmoles, calculated as titanium atom, of the titanium catalyst component (A), and while maintaining the temperature at 20° C., 7.5 kg of 4-methyl-1-pentene was added over the course of 1 hour. The reaction was carried out further at 20° C. Furthermore, 500 g of 3-methyl-1-pentene was added at a time, and the reaction was carried out at 20° C. for 2 hours. The reaction product was filtered through a glass filter, and suspended in 25 liters of n-hexane. The amount of the product obtained by the pre-polymrization was 300 g per mmoles of titanium.

Polymerization

Figure 1:
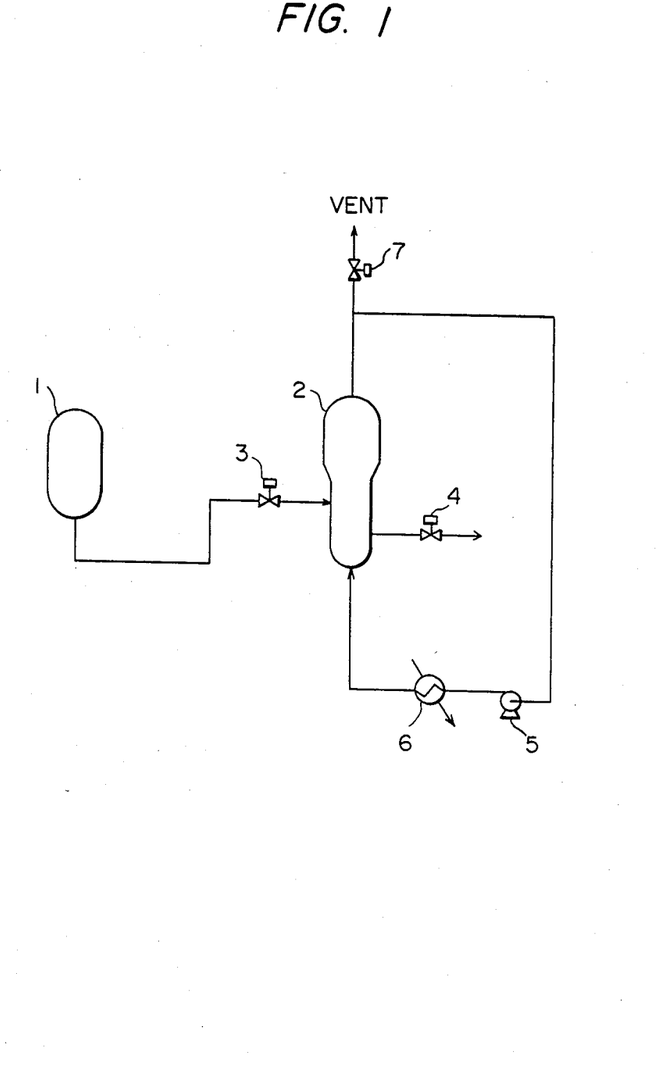
FIG. 1 is a schematic view showing one example of an apparatus for practicing the process of this invention, which comprises polymerization vessels 1 and 2, valves 3 and 4 for withdrawing the polymerization mixture, a circulating gas blower 5, a circulating gas heater 6, and a gas withdrawing valve 7.

A polymerization apparatus of the type schematically shown in FIG. 1 was used. Polymerization vessel 1 had a diameter of 230 mm and a capacity of 20 liters, and polymerization vessel 2 was of the fluidized layer type and had a diameter of 340 mm and a capacity at the reaction portion of 35 liters.

A hexane slurry of the catalyst subjected to the pre-polymerization as above was continuously fed into polymerization vessel 1 at each of the rates (as titanium atom) indicated in Table 3. Furthermore, triethyl aluminum and trimethylmethoxysilane were continuously fed into polymerization vessel 1 each at a rate of 20 moles/- hour. 4-Methyl-1-pentene, 1-decene and hydrogen were also fed continuously into polymerization vessel 1 at the rates indicated in Table 3 and slurry polymerization was carried out continuously. The polymerization temperature was 50° C., and the polymerization pressure was adjusted to 3 kg/cm$^2$-G by pressurization with nitrogen. The capacity of the reaction portion of the vessel was controlled by the amount of the slurry withdrawn so that the average residence time in the vessel was as indicated in Tale 3.

The slurry discharged from polymerization vessel 1 was continuously fed into polymerization vessel 2. While hydrogen was continuously fed into vessel 2 at the rate indicated in Table 3, vapor-phase polymerization was carried out continuously. The slurry discharged from polymerization vessel 1 was flushed and converted into a gas by the heat of polymerization reaction in polymerization vessel 2, the sensible heat of the gas circulating from the top to the bottom of polymerization vessel 2, and the heating of polymerization vessel 2. The vaporphase polymerization was carried out at a temperature of 100° C., a pressure of 1 kg/cm$^2$-G and a gas superficial velocity in an empty column of 40 cm/sec. The pressure was contolled by withdrawing part of the gas in the vessel. The amount of the polymer withdrawn was controlled so that the capacity of the reaction portion of the vessel was 35 liters.

The results of the polymerization are shown in Table 4.

20 mole % of (B) recurring units derived from a linear alpha-olefin containing 2 to 20 carbon atoms and having an intrinsic viscosity $[\eta]_H$, determined in decalin at 135° C., of 5 to 30 dl/g, and [II] a branched alpha-olefinic polymer composed substantially of 80 to 100 mole % of (A) recurring units derived from a branched alpha-olefin containing 5 to 10 carbon atoms and having a branch at the 3-position or a position of a higher number and 0 to 20 mole % of (B) recurring units derived from a linear alpha-olefin containing 2 to 20 carbon atoms and having an intrinsic viscosity $[\eta]_L$, determined in decalin at 135° C., of 1 to 10 dl/g;

wherein the $[\eta]_H/[\eta]_L$ ratio is from 2 to 30, the weight ratio of the polymer [I] to the polymer [II] is from 1/99 to 60/40, said composition has an intrinsic viscosity measured in decalin at 135° C., of 1 to 20 dl/g, and the ratio of the melt flow rate of said composition measured at 260° C. under a load of 5 kg [MFR$^{5kg}_{260°C.}$] to its melt flow rate measured at 260° C. under a load of 1 kg [MFR$^{1kg}_{260°C.}$] is from 10 to 30.

2. A branched alpha-olefinic polymer composition according to claim 1 comprising

[I] a branched alpha-olefinic polymer composed Substantially of 80 to 100 mole % of (A) recurring units derived from 4-methyl-1-pentene and 0 to 20 mole % of (B) recurring units derived from a linear

TABLE 3

| | Polymerization conditions | | | | | | | | |
|---|---|---|---|---|---|---|---|---|---|
| | Polymerization vessel 1 (first step) | | | | | | Polymerization vessel 2 (second step) | | |
| Example | Amount of the catalyst subjected to pre-polymerization (mmole/hr) | Amount of 4-methyl-1-pentene fed (kg/hr) | Amount of 1-decene fed (kg/hr) | Hydrogen partial pressure (atm.) | Temperature (°C.) | Average residence time (min.) | Amount of hydrogen fed (Nl/hr) | Temperature (°C.) | Time (hr) |
| 20 | 0.039 | 30 | 600 | 0.1 | 50 | 20 | 5.5 | 100 | 11 |
| 21 | 0.035 | 25 | 500 | 0 | 50 | 5 | 10.0 | 100 | 15 |
| 22 | 0.035 | 25 | 500 | 0 | 50 | 10 | 4.0 | 100 | 15 |

TABLE 4

| | Results of polymerization | | | | | | | | | |
|---|---|---|---|---|---|---|---|---|---|---|
| | Amount of | Polymer [I] | | | | Polymer [II] | | | | |
| Example | the polymer yielded (g/mmole Ti) | $[\eta]_H$ (dl/g) | Amount polymerized (wt %) | Branched alpha-olefin (mole %) | Linear alpha-olefin (mole %) | $[\eta]_L$ (dl/g) | Amount polymerized (wt %) | Branched alpha-olefin (mole %) | Linear alpha-olefin (mole %) | $[\eta]_H/[\eta]_L$ |
| 20 | 24,800 | 9.15 | 53.0 | 98.9 | 1.1 | 3.92 | 47.0 | 98.8 | 1.2 | 2.33 |
| 21 | 20,900 | 16.9 | 11.0 | 98.8 | 1.2 | 2.81 | 89.0 | 98.8 | 1.2 | 6.01 |
| 22 | 20,400 | 15.0 | 27.5 | 98.8 | 1.2 | 5.31 | 72.5 | 98.8 | 1.2 | 2.82 |

| | Results of polymerization Polymer composition finally obtained | | | | Decane |
|---|---|---|---|---|---|
| Example | $[\eta]$ (dl/g) | Linear alpha-olefin content (mole %) | MFR$^{5kg}_{260°C.}$/MFR$^{1kg}_{260°C.}$ | $\overline{M}w/\overline{M}n$ | soluble content (wt %) |
| 20 | 6.69 | 1.2 | 11.9 | 4.8 | 4.2 |
| 21 | 4.36 | 1.2 | 17.9 | 6.7 | 4.2 |
| 22 | 7.97 | 1.2 | 15.7 | 6.6 | 4.6 |

What is claimed is:

1. A branched alpha-olefinic polymer composition comprising

[I] a branched alpha-olefinic polymer composed substantially of 80 to 100 mole % of (A) recurring units derived from a branched alpha-olefin containing 5 to 10 carbon atoms and having a branch at the 3-position or a position of a higher number and 0 to alpha-olefin containing 6 to 14 carbon atoms and having an intrinsic viscosity $[\eta]_H$, determined in decalin at 135° C., of 5 to 30 dl/g, and [II] a branched alpha-olefinic polymer composed substantially of 80 to 100 mole % of (A) recurring units derived from 4-methyl-1-pentene and 0 to 20 mole % of (B) recurring units derived from a linear alpha-olefin containing 6 to 14 carbon atoms and having an intrinsic viscosity $[\eta]_L$, determined in decalin at 135° C., of 1 to 10 dl/g;

wherein the $[\eta]_H/[\eta]_L$ ratio is from 2 to 30, the weight ratio of the polymer [I] to the polymer [II] is from 1/99 to 60/40, said composition has an intrinsic viscosity $[\eta]$, measured in decalin at 135° C., of 1 to 20 dl/g, and the ratio of the melt flow rate of said composition measured at 260° C. under a load of 5 kg $[MFR^{5kg}{}_{260°\,C.}]$ to its melt flow rate measured at 260° C. under a load of 1 kg $[MFR^{1kg}{}_{260°\,C.}]$ is from 10 to 30.

3. A branched alpha-olefinic polymer composition according to claim 1 comprising

[I] a branched alpha-olefinic polymer composed substantially of 97 to 100 mole % of (A) recurring units derived from 4-methyl-1-pentene and 0 to 3 mole % of (B) recurring units derived from a linear alpha-olefin containing 6 to 14 carbon atoms and having an intrinsic viscosity $[\eta]_H$, determined in decalin at 135° C., of 9 to 29.6 dl/g, and

[II] a branched alpha-olefinic polymer composed substantially of 97 to 100 mole % of (A) recurring units derived from 4-methyl-1-pentene and 0 to 3 mole % of (B) recurring units derived from a linear alpha-olefin containing 6 to 14 carbon atoms and having an intrinsic viscosity $[\eta]_H$, determined in decalin at 135° C., of 1.15 to 5.40 dl/g;

wherein the $[\eta]_H/[\eta]_L$ ratio is from 2.2 to 26, the weight ratio of the polymer [I] to the polymer [II] is from 5.1/94.9 o 54.2/45.8 said composition has an intrinsic viscosity $[\eta]$, measured in decalin at 135° C., of 1 to 9.16 dl/g, and the ratio of the melt flow rate of said composition measured at 260° C. under a load of 5 kg $[MFR^{5kg}{}_{260°\,C.}]$ to its melt flow rate measured at 260° C. under a load of 1 kg is from 11.9 to 24.3.

4. A branched alpha-olefinic polymer composition according to claim 1 comprising [I] a branched alpha-olefinic polymer composed substantially of 80 to 100 mole % of (A) recurring units derived from 4-methyl-1-pentene and 0 to 20 mole % of (B) recurring units derived from a linear alpha-olefin selected from the group consisting of 1-hexene, 1-dodecene and 1-tetradecene and having an intrinsic viscosity $[\eta]_H$, determined in decalin at 135° C., of 5 to 30 dl/g, and [II]a branched alpha-olefinic polymer composed substantially of 80 to 100 mole % of (A) recurring units derived from 4-methyl-1-pentene and 0 to 20 mole % of (B) recurring units derived from a linear alpha-olefin selected from the group consisting of 1-hexene, 1-dodecene and 1-tetradecene and having an intrinsic viscosity $[\eta]_L$, determined in decalin at 135° C., of 1 to 10 dl/g;

wherein the $[\eta]_H/[\eta]_L$ ratio is from 2 to 30, the weight ratio of the polymer [I] to the polymer [II] is from 1/99 to 60/40, said composition has an intrinsic viscosity measured in decalin at 135° C., of 1 to 20 dl/g, and the ratio of the melt flow rate of said composition measured at 260° C. under a load of 5 kg $[MFR^{5kg}{}_{260°\,C.}]$ to its melt flow rate measured at 260° C. under a load of 1 kg $[MFR^{1kg}{}_{260°\,C.}]$ is from 10 to 30.

5. A branched alpha-olefinic polymer composition according to claim 1 comprising

[I] a branched alpha-olefinic polymer composed substantially of 97 to 100 mole % of (A) recurring units derived from 4-methyl-1-pentene and 0 to 3 mole % of (B) recurring units derived from a linear alpha-olefin selected from the group consisting of 1-hexene, 1-dodecene and 1-tetradecene and having an intrinsic viscosity $[\eta]_H$, determined in decalin at 135° C., of 9 to 29.6 dl/g, and [II] a branched alpha-olefinic polymer composed substantially of 97 to 100 mole % of (A) recurring units derived from 4-methyl-1-pentene and 0 to 3 mole % of (B) recurring units derived from a linear alpha-olefin selected from the group consisting of 1-hexene, 1-dodecene and 1-tetradecene and having an intrinsic viscosity $[\eta]_L$, determined in decalin at 135 ° C., of 1.15 to 5.40 dl/g;

wherein the $[\eta]_H/[\eta]_L$ ratio is from 2.2 to 26, the weight ratio of the polymer [I] to the polymer [II] is from 5.1/94.9 to 54.2/45.8 said composition has an intrinsic viscosity $[\eta]$, measured in decalin at 135° C., of 1 to 9.16 dl/g, and the ratio of the melt flow rate of said composition measured at 260° C. under a load of 5 kg $[MFR^{5kg}{}_{260°\,C.}]$ to its melt flow rate measured at 260° C. under a load of 1 kg $[MFR^{1kg}{}_{260°\,C.}]$ is from 11.9 to 24.3.

6. A process for producing a branched alpha-olefinic polymer composition having an intrinsic viscosity $[\eta]$, measured in decalin at 135° C., of 1 to 20 dl/g and a ratio of its melt flow rate measured at 260° C. under a load of 5 kg ]to its melt flow rate measured at 260° C. under a load of 1 kg $[MFR^{1kg}{}_{260°\,C.}]$ of from 10 to 30, which comprises polymerizing or copolymerizing a branched alpha-olefin containing 5 to 10 carbon atoms and having a branch at the 3-position or a position having a higher number, or a mixture of the branched alpha-olefin and a linear alpha-olefin containing 2 to 20 carbon atoms in a multiplicity of polymerization steps in the presence of a catalyst formed from (A) a highly stereoregular titanium catalyst component containing magnesium, titanium, halogen and an electron donor as essential ingredients, (B) an organoaluminum compound, and (C) an electron donor; wherein in at least one of the polymerization steps, a branched alpha-olefinic polymer [I] having an intrinsic viscosity $[\eta]_H$, measured in decalin at 135° C., of 5 to 30 dl/g is formed in an amount of 1 to 60% by weight based on the branched alpha-olefinic polymer composition formed in the entire polymerization steps, and in another polymerization step, a branched alpha-olefinic polymer [II] having an intrinsic viscosity $[\eta]_L$, measured in decalin at 135° C., of 1 to 10 dl/g with the $[\eta_H/[\eta_L$ L ratio being from 2 to 30 is formed in an amount of 99 to 40% by weight based on the branched alpha-olefin polymer composition formed in the entire polymerization steps.

7. A process according to claim 6 for producing a branched alpha-olefinic polymer composition having an intrinsic viscosity $[\eta]$, measured in decalin at 135° C., of 1 to 20 dl/g and a ratio of its melt flow rate measured at 260° C. under a load of 5 kg $[MFR^{5kg}{}_{260°\,C.}]$ to its melt flow rate measured at 260° C. under a load of 1 kg $[MFR^{1kg}{}_{260°\,C.}]$ *of from* 10 to 30, which comprises polymerizing or copolymerizing 4-methyl-1-pentene, or a mixture of 4-methyl-1-pentene and a linear alpha-olefin containing 6 to 14 carbon atoms in a multiplicity of polymerization steps in the presence of a catalyst formed from (A) a highly stereoregular titanium catalyst component containing a magnesium halide, a titanium halide, and an electron donor composed mainly of a dialkyl phthalate as essential ingredients, (B) an organoaluminum compound composed mainly of a trialkyl aluminum, and (C) an electron donor composed mainly of a trialkylalkoxysilane; wherein     in at least one of the polymerization steps, a branched alpha-olefinic polymer [I] having an intrinsic viscosity $[\eta]_H$, measured in decalin at 135° C., of 5 to 30 dl/g is formed in an amount of 1 to 60% based on the branched alpha-olefinic polymer composition formed in the entire polymerization steps, and     in another polymerization step, a branched alpha-olefinic polymer [II] having an intrinsic viscosity $[\eta]_L$, measured in decalin at 135° C., of 1 to 10 dl/g with the $[\eta]_H/[\eta]_L$ ratio being from 2 to 30 is formed in an amount of 99 to 40% by weight based on the branched alpha-olefin polymer composition formed in the entire polymerization steps.

8. A process according to claim 6 for producing a branched alpha-olefinic polymer composition having an intrinsic viscosity $[\eta]$, measured in decalin at 135° C., of 2.60 to 9.16 dl/g and a ratio of its melt flow rate measured at 260° C. under a load of 5 kg [$MFR^{5kg}_{260°\ C.}$] to its melt flow rate measured at 260° C. under a load of 1 kg [$MFR^{1kg}_{260°\ C.}$] of from 11.9 to 24.3, which comprises polymerizing or copolymerizing 4-methyl-1-pentene, or a mixture of 4-methyl-1-pentene and a linear alpha-olefin containing 6 to 14 carbon atoms in a multiplicity of polymerization steps in the presence of a catalyst formed from (A) a highly stereoregular titanium catalyst component containing a magnesium halide, a titanium halide, and an electron donor composed mainly of a dialkyl phthalate as essential ingredients, (B) an organoaluminum compound composed mainly of a trialkyl aluminum, and (C) an electron donor composed mainly of a trialkylalkoxysilane; wherein     in at least oe of the polymerization steps, a branched alpha-olefinic polymer [I] having an intrinsic viscosity H, measured in decalin at 135° C., of 9.0 to 29.6 dl/g is formed in an amount of 5.1 to 54.2% by weight based on the branched alpha-olefinic polymer composition formed in the entire polymerization steps, and     in another polymerization step, a branched alpha-olefinic polymer [II] having an intrinsic viscosity $[\eta]_L$, measured in decalin at 135° C., of 1.15 to 5.40 dl/g with the $[\eta]_H/[\eta]_L$ ratio being from 2.2 to 26 is formed in an amount of 94.9 to 45.8% by weight based on the branched alpha-olefin polymer composition formed in the entire polymerization steps.

9. A process according to claim 6 for producing a branched alpha-olefinic polymer composition having an intrinsic viscosity $[\eta]$, measured in decalin at 135° C., of 1 to 20 dl/g and a ratio of its melt flow rate measured at 260° C. under a load of 5 kg [$MFR^{5kg}_{260°\ C.}$] to its melt flow rate measured at 260° C. under a load of 1 kg [$MFR^{1kg}_{260°\ C.}$] of from 10 to 30, which comprises polymerizing or copolymerizing 4-methyl-1-pentene, or a mixture of 4-methyl-1-pentene and a linear alpha-olefin selected from the group consisting of 1-hexene, 1-decene and 1-tetradecene in a multiplicity of polymerization steps in the presence of a catalyst formed from (A) a highly stereoregular titanium catalyst component containing magnesium chloride, titanium tetrachloride and an electron donor selected from the group consisting of diethyl phthalate, di-n-butyl phthalate and diisobutyl phthalate as essential ingredients, (B) an organoaluminum compound selected from the group consisting of triethyl aluminum, triisobutyl aluminum and tri-n-hexyl aluminum, and (C) an electron donor selected from the group consisting of trimethylmethoxysilane, trimethylethoxysilane, triethylmethoxysilane and trimethyl-n-propoxysilane; wherein     in at least one of the polymerization steps, a branched alpha-olefinic polymer [I] having an intrinsic viscosity $[\eta]_H$, measured in decalin at 135° C., of 5 to 30 dl/g is formed in an amount of 1 to 60% by weight based on the branched alpha-olefinic polymer composition formed in the entire polymerization steps, and     in another polymerization step, a branched alpha-olefinic polymer [II] having an intrinsic viscosity $[\eta]_L$, measured in decalin at 135° C., of 1to 10 dl/g with the $[\eta]_H/[\eta]_L$ ratio being from 2 to 30 is formed in an amount of 99 to 40% by weight based on the branched alpha-olefin polymer composition formed in the entire polymerization steps.

10. A process according to claim 6 for producing a branched alpha-olefinic polymer composition having an intrinsic viscosit $[\eta]$, measured in decalin at 135° C., of 2.60 to 9.16 dl/g and a ratio of its melt flow rate measured at 260° C. under a load of 5 kg [$MFR^{5kg}_{260°\ C.}$] to its melt flow rate measured at 260° C. under a load of 1 kg [$MFR^{1kg}_{260°\ C.}$] of from 11.9 to 24.3, which comprises polymerizing or copolymerizing 4-methyl-1-pentene, or a mixture of 4-methyl-1-pentene and a linear alpha-olefin selected from the group consisting of 1-hexene, 1-decene and 1-tetradecene in a multiplicity of polymerization steps in the presence of a catalyst formed from (A) a highly stereoregular titanium catalyst component containing magnesium chloride, titanium tetrachloride and an electron donor selected from the group consisting of diethyl phthalate, di-n-propyl phthalate, di-n-butyl phthlate and diisobutyl phthalate as essential ingredients, (B) an organoaluminum compound selected from the group consisting of triethyl aluminum, triisobutyl aluminum and tri-n-hexyl aluminum and (C) an electron donor composed selected from trimethylmethoxysilane, trimethylethoxysilane, triethylmethoxysilane and trimethyl-n-propoxy silane, wherein     in at least one of the polymerization steps, a branched alpha-olefinic polymer [I] having an intrinsic viscosity $[\eta]_H$, measured in decalin at 135° C., of 9.0 to 29.6 dl/g is formed in an amount of 5.1 to 54.2% by weight based on the branched alpha-olefinic polymer composition formed in the entire polymerization steps, and     in another polymerization step, a branched alpha-olefinic polymer [II] having an intrinsic viscosity $[\eta]_L$, measured in decalin at 135° C., of 1.15 to 5.40 dl/g with the $[\eta]_H/[\eta]_L$ ratio being from 2.2 to 26 is formed in an amount of 94.9 to 45.8 % by weight based on the branched alpha-olefin polymer composition formed in the entire polymerization steps.

* * * * *

UNITED STATES PATENT AND TRADEMARK OFFICE
CERTIFICATE OF CORRECTION

PATENT NO. : 4,798,866

DATED : January 17, 1989

INVENTOR(S) : JUNICHI YOSHITAKE ET AL.

It is certified that error appears in the above-identified patent and that said Letters Patent is hereby corrected as shown below:

Claim 1, line 25 of the claim, before "measured", --[η]-- should be inserted.

Claim 2, line 3 of the claim, "Sub-" should read --sub- --.

Claim 3, line 15 of the claim, "$[\eta]_H$" should read --$[\eta]_L$--;

Claim 3, line 24 of the claim, after "1 kg", --[$MFR^{1kg}_{260°C}$]-- should be inserted.

Claim 4, line 9 of the claim, "[II]a" should read --[II] a--;

Claim 4, line 21 of the claim, before "measured", --[η]-- should be inserted.

UNITED STATES PATENT AND TRADEMARK OFFICE
CERTIFICATE OF CORRECTION

PATENT NO. : 4,798,866
DATED : January 17, 1989
INVENTOR(S) : JUNICHI YOSHITAKE ET AL.

It is certified that error appears in the above-identified patent and that said Letters Patent is hereby corrected as shown below:

Claim 6, line 5 of the claim, "]to" should read --$[MFR^{5kg}_{260°C}]$--.

Claim 8, line 19 of the claim, "oe" should read --one--;

Claim 8, line 21 of the claim, before "$H$", --$[\eta]$-- should be inserted.

Signed and Sealed this

Eleventh Day of July, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,798,866
DATED      : January 17, 1989
INVENTOR(S): JUNICHI YOSHITAKE, ET AL.

It is certified that error appears in the above-identified patent and that said Letters Patent is hereby corrected as shown below:

On the face of the patent, under "Foreign Application Priority Data", the second listed Japanese application number should be changed from "61-167892" to read --62-167892--.

Signed and Sealed this

Twenty-ninth Day of August, 1989

Attest:

DONALD J. QUIGG

*Attesting Officer*   *Commissioner of Patents and Trademarks*